(No Model.)
2 Sheets—Sheet 1.

G. H. HURLBUT.
CAMERA.

No. 440,228. Patented Nov. 11, 1890.

Witnesses:
C. B. Clark
J. S. Clark

Inventor:
George H. Hurlbut.
by A. O. Behel.
Atty.

(No Model.) 2 Sheets—Sheet 2.

G. H. HURLBUT.
CAMERA.

No. 440,228. Patented Nov. 11, 1890.

Witnesses:
C. B. Johart
J. S. Clark

Inventor:
George H. Hurlbut
By A. O. Behel
Atty.

UNITED STATES PATENT OFFICE.

GEORGE H. HURLBUT, OF BELVIDERE, ILLINOIS.

CAMERA.

SPECIFICATION forming part of Letters Patent No. 440,228, dated November 11, 1890.

Application filed April 15, 1889. Serial No. 307,273. (No model.)

*To all whom it may concern:*

Be it known that I, GEORGE H. HURLBUT, a citizen of the United States, residing at Belvidere, in the county of Boone and State of Illinois, have invented certain new and useful Improvements in Cameras, of which the following is a specification.

The object of this invention is to construct a camera of box form, having an upper and lower compartment, the upper compartment holding a movable plate magazine and finder, the lower compartment holding the lens and a sensitized plate, one end of the camera being a hinged door, upon the inner surface of which is supported a shutter.

Figure 1:
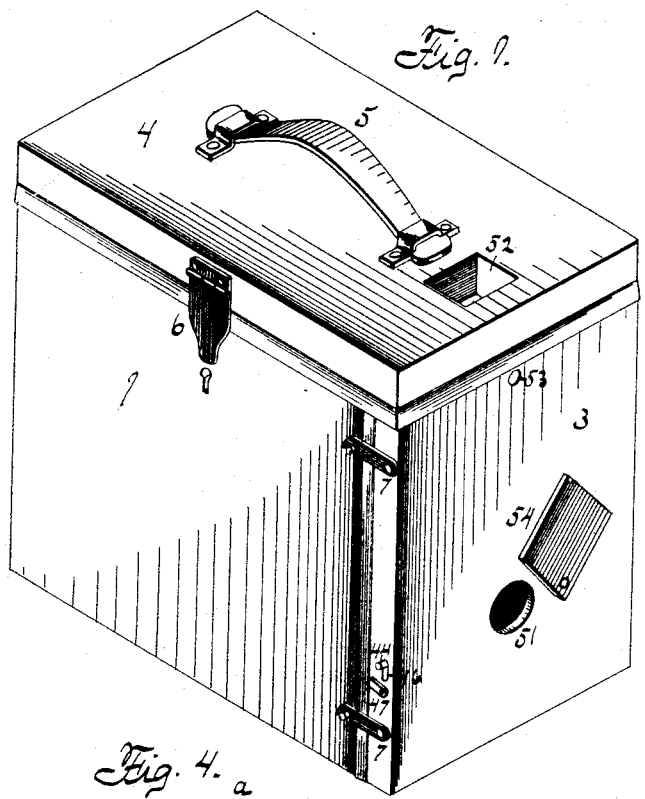
Figure 2:
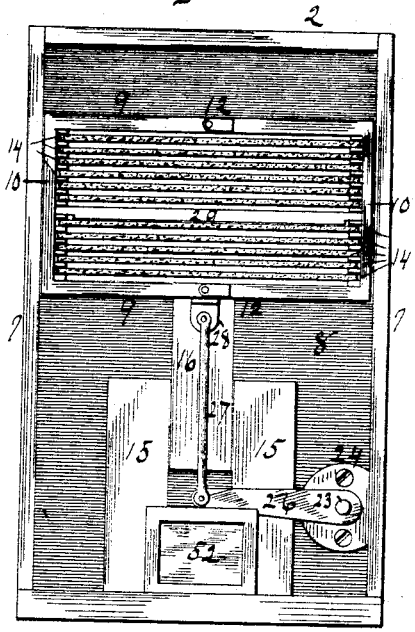
Figure 4:
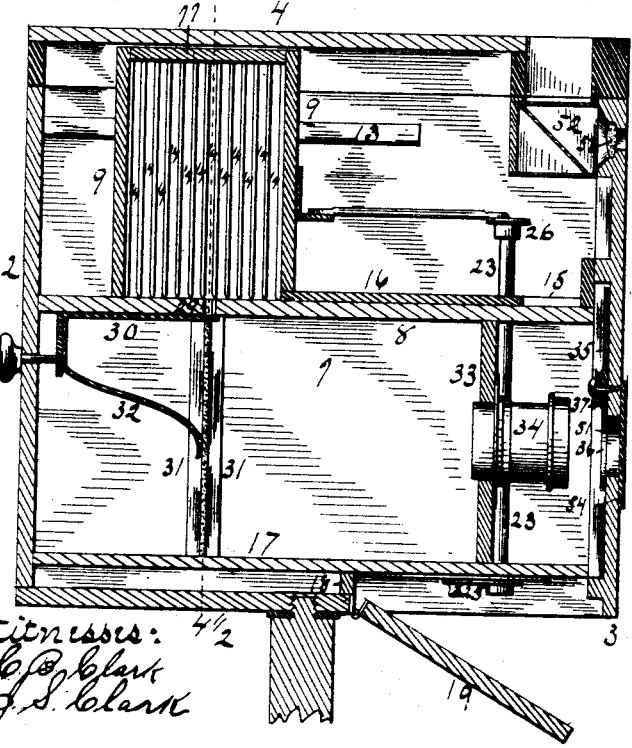
Figure 3:
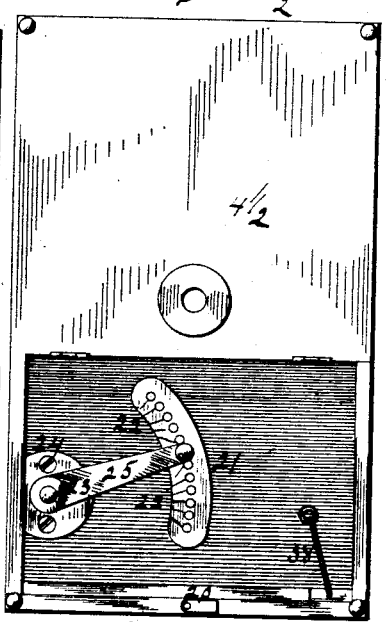
Figure 5:
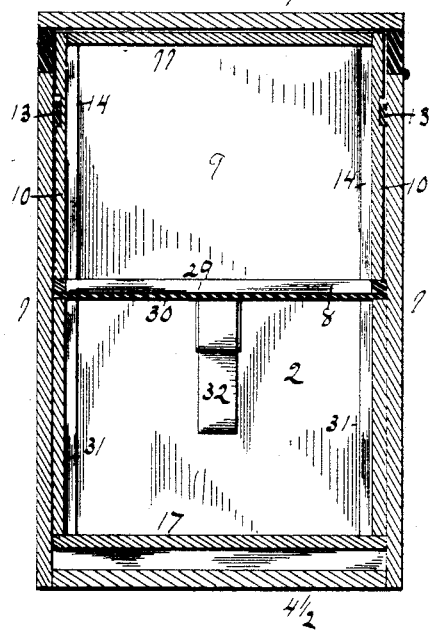
Figure 6:
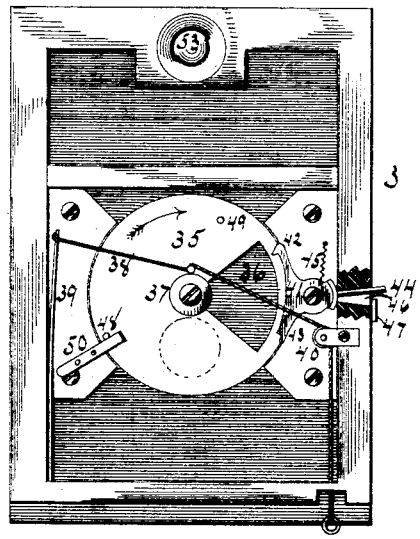
Figure 7:
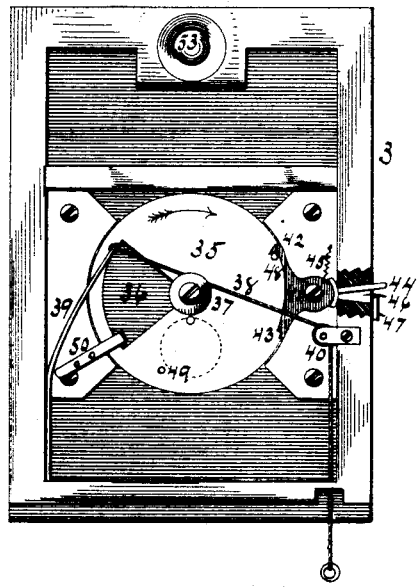
Figure 8:
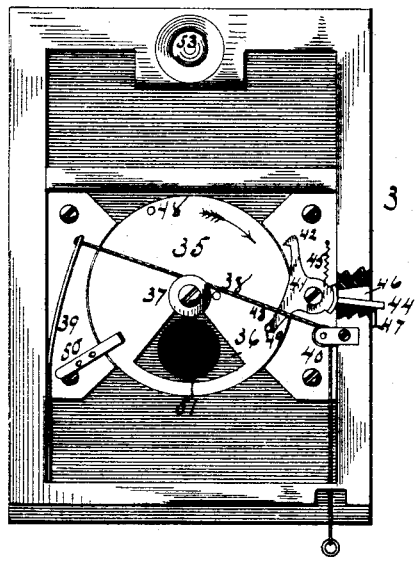

In the accompanying drawings, Figure 1 is an isometrical representation of my improved camera. Fig. 2 is a plan view with the cover or lid removed. Fig. 3 is an under face view with the lid portion thereof removed. Fig. 4 is a lengthwise vertical central section. Fig. 5 is a transverse vertical section on dotted line *a*, Fig. 4. Fig. 6 is an inner face view of the hinged end, showing the shutter in its normal position. Fig. 7 is also an inner face view of the hinged end, showing the shutter set, ready for an exposure. Fig. 8 is an inner face view of the hinged end, showing the shutter in position for a time exposure.

The camera represented in the accompanying drawings is of rectangular box form. The outer surface is composed of the sides 1, end 2, hinged end 3, top lid or cover 4, hinged to one of the side walls, and a bottom 4½. A handle 5 has a connection with the top 4, and the top may be secured to the body of the camera by means of the lock 6. The hinged end 3 has clasps or hooks 7, connecting it with the body of the camera.

A partition 8 divides the camera into an upper and lower compartment. Within the upper compartment is placed a plate-magazine, composed of sides 9, ends 10, and a cover 11. The cover is held in place by the turn-buttons 12. The sides of the magazine are grooved, and through these grooves pass guides 13, which are secured to the sides 1 of the camera. The inner ends of the magazine are formed with vertical grooves 14, in which the sensitized plates are placed. Cleats 15 are secured to the upper face of the partition 8, and a center strip 16 is secured to the bottom of the plate-magazine and slides between the cleats 15.

A horizontal partition 17 is placed near the bottom of the camera, and a transverse partition 18 divides the space between the partition 17 and bottom 4½. A portion of the bottom is hinged to form a drop-lid 19, and is held closed by the button 20. Within the recess closed by the lid 19 is placed a segment 21, having a series of holes 22. A vertical shaft 23 passes through the lower compartment and extends some distance into the upper compartment, and is held in position to oscillate by bearings 24. At the lower end of the shaft 23 is secured an arm 25, the free end of which is provided with a pin which enters the holes 22 in the segment 21. The upper end of the shaft 23 has a connection with the plate-magazine by an arm 26 and link 27, connecting with a bracket 28 secured to the magazine. By this arrangement of the parts, and by means of the arm 25 and its connection with the plate-magazine, the magazine can be moved so as to bring any one of its grooves directly over the slot 29 in the partition 8. The position of the magazine is determined by the arm 25 and its relation with the perforated segment 21. The guides 13 and cleats 15 form the guides for the movement of the magazine.

The camera is turned upside down, which will place all the plates contained in the plate-magazine against the top 11, and thus permit the plates to pass by the slot 29 in the partition 8. When the proper plate has been brought over the slot, the slide 30 is drawn back and the box righted, which will permit the plate to drop into the lower compartment and is guided in its movement by cleats 31, placed on either side. The slide 30 is then pushed in to close the slot and also bring the flat spring 32 against the center of the back of the plate, thus holding it firmly against the front cleat while the exposure is being made. After the exposure has been made the slide is drawn back, which opens the slot. The box is again placed upside down to transfer the plate from the lower compartment to its original position in the plate-magazine and the magazine moved so as to bring the next or any desired plate over the slot, and the process of exposing the plate again repeated until all the plates have thus been exposed and returned to the plate-magazine. The slot 29 has its front center portion of greater width than its ends, thus preventing the sensitized surface of the plate coming in contact with the side of the slot. A vertical partition 33 in the lower compartment holds the lens employed in taking the picture. This partition is placed the required distance from the plate when in its position for exposure.

The hinged end of the camera carries the shutter for giving the exposure. The shutter arrangement consists of the shutter proper 35, which is of circular form, having a pivoted connection with the inside of the hinged end. A portion of the shutter is cut away, as at 36. A hub 37 has its periphery grooved, and a string 38 passed around the hub, one end connecting with a flat spring 39, secured to the side of the recessed portion of the hinged end, and the other end passing around a sheave 40 and thence downward, having a ring upon its end. By means of this string the shutter is moved in one direction, which will bend the spring, and when the string is released the spring will return the shutter to its normal position. A pawl 41 has a pivotal connection with the hinged end outside of the periphery of the shutter, and has one arm 42 in hook form, its other arm formed with a notch 43. An arm 44 extends through the side of the hinged end sufficiently to enable the operator to control the movements of the shutter, and a shield closes the opening, preventing the admission of light. A spring 45 holds the pawl in the position shown in Fig. 6, and the slot 46 controls the fullest extent of the movement of the pawl. A pivoted stop 47 will permit the pawl to move about one-half its throw or a full throw as the stop is adjusted.

Upon the face of the shutter are located two pins 48 and 49. When the shutter is in the position shown in Fig. 6, the pin 48 comes in contact with a stop 50, thus holding it in its normal position. By a downward pull of the string the shutter is made to revolve in the direction indicated by the arrow, which will bring the pin 48 into engagement with the hooked end 42 of the pawl, as shown in Fig. 7. With the stop 47 in the position shown in Fig. 7 a downward movement by the operator of the arm 44 and instantaneous exposure are made by the opening 36 of the shutter passing the opening 51 of the hinged end and returning it to its normal position.

When a timed exposure is desired, the parts will occupy the position shown in Fig. 7, excepting the stop 47, which is moved so as to allow the arm 44 to have the full movement of the slot 46. The operator will press the arm 44 of the pawl downward, which will release the pin 48 from its engagement with the hooked end of the pawl and permit the shutter to rotate. By this movement of the pawl the notched end will be placed in position to receive the pin 49, as shown in Fig. 8, thus stopping the shutter when its opening coincides with the opening 51. After the necessary time for the exposure has been given the arm 44 is released, and the shutter will return to its normal position. The string for operating the shutter passes through an opening and enters the lower receptacle, in which is placed the mechanism for adjusting the plate-magazine. In the upper front end of the upper receptacle is located a finder 52, usually found in this class of cameras. The lens 53 of the finder is placed in the upper end of the hinged end. I do not deem it necessary to go into a minute description of the finder. The opening through which the image thrown on the finder may be seen is in this instance placed in the center front end of the camera. I have also provided the opening 51 with a pivoted cover 54, for the purpose of preventing the admission of light into the interior of the camera while the shutter is being set.

When the plate-magazine is filled with sensitized plates, the camera may be placed in position for use by turning the box upside down, opening the bottom lid 19, adjusting the plate-magazine to bring the required plate into position, setting the shutter by pulling on the string, adjusting the stop 27, and closing the lid, pulling the slide 30, so as to open the slot 29, then righting the camera, which will permit the plate to descend into the lower compartment, pushing in the slide 30, consequently pressing the plate to its position, and raising the cover 54. When the desired object is properly seen in the finder, the operator will press down on the arm 44, and the exposure will be made. The slide 30 is then moved back, the camera again turned upside down, and the exposed plate returned to its original position in the plate-magazine, and the operation may be repeated as many times as there are plates in the plate-magazine.

It is often desirable to carry different plates as to the length of time required for exposure, and by means of the index the location of the required plate in the plate-magazine may be determined and brought forth for exposure.

When the plates have been exposed, they are developed in the usual manner. This arrangement permits the use of any make of plate and the plates can be developed by any photographer.

The outside of the camera may be covered with leather, and a portion overlapping the joints, as shown in Fig. 1, thus preventing the admission of light into the interior of the camera.

The camera herein represented may be placed on a tripod in the usual manner of supporting such cameras.

The shutter herein shown and described will not be claimed in detail in this application, and I hereby reserve the right to file a new application for said shutter.

I claim as my invention—

1. A camera composed of a main portion divided by a partition into two compartments, a top or cover for opening one compartment having a hinged connection with the main portion, and an end hinged to the main portion, for opening the other compartment, and a shutter for giving the exposures, carried by the end portion, substantially as set forth.

2. A camera having two compartments, a plate-magazine in one compartment and a lens in the other, a passage for admitting the plates into the lens-compartment, a slide for closing the passage between said compartments, and a spring for pressing against the plate to be exposed, the slide and the spring acting in unison, whereby, after one of the plates has been admitted to the lens-compartment, the slide and spring are operated simultaneously, the one to close said passage and the other to press against the plate to be exposed, substantially as set forth.

3. A camera consisting of a plate-compartment and an exposing-compartment, a plate-magazine within the former compartment, having a lid or cover, and a cover for said plate-compartment above the magazine, whereby one or more plates may be removed from the magazine for developing without the removal of said magazine, substantially as set forth.

4. A camera having two compartments, a plate-magazine in one compartment and a lens in the other, a portion of the bottom forming a lid, and mechanism placed in said bottom for adjusting the plate-magazine, substantially as set forth.

5. A camera having a plate-magazine and a lens, a pivoted index-finger, and a pivotal connection between said index-finger and the plate-magazine for adjusting the magazine, substantially as set forth.

6. A camera having a plate-magazine and a lens, and means for adjusting the plate-magazine to bring any one of the plates into focus with the lens, said means consisting of an index-plate and an index-finger, said index-finger having a link-connection with the plate-magazine, substantially as set forth.

GEORGE H. HURLBUT.

Witnesses:
A. O. BEHEL,
E. BEHEL.